United States Patent [19]

Schubert

[11] 4,424,093

[45] Jan. 3, 1984

[54] APPARATUS FOR PRODUCTION OF ALBUM LEAVES

[75] Inventor: Bernhard A. Schubert, Neu-Bornsen, Fed. Rep. of Germany

[73] Assignee: Leuchtturm Albenverlag Paul Koch KG, Geesthacht, Fed. Rep. of Germany

[21] Appl. No.: 423,792

[22] Filed: Sep. 27, 1982

Related U.S. Application Data

[62] Division of Ser. No. 295,823, Aug. 24, 1981.

[30] Foreign Application Priority Data

Aug. 25, 1980 [DE] Fed. Rep. of Germany ....... 3032016

[51] Int. Cl.³ ....................... B32B 31/12; B32B 31/18; B32B 31/20

[52] U.S. Cl. ...................................... 156/497; 40/159; 83/255; 118/211; 118/222; 118/225; 118/241; 156/291; 156/518; 156/521; 156/530; 156/548; 156/549; 156/562; 156/578

[58] Field of Search ............... 156/497, 518, 517, 520, 156/544, 546, 548, 549, 560, 562, 578, 291, 530, 521; 118/211, 225, 222, 241; 83/255; 40/159

[56] References Cited

U.S. PATENT DOCUMENTS

| | | | |
|---|---|---|---|
| 890,309 | 6/1908 | Smith | 118/222 |
| 2,033,553 | 3/1936 | Scholl | 156/261 |
| 2,367,490 | 1/1945 | Ducklo | 156/518 |
| 2,861,369 | 11/1958 | Widmaier | 40/159 |
| 2,958,437 | 11/1960 | Mengis | 156/548 |
| 3,322,591 | 5/1967 | Cleverly | 156/562 |
| 3,741,058 | 6/1973 | Fish | 83/255 |
| 3,776,798 | 12/1973 | Milano | 156/291 |
| 3,868,291 | 2/1975 | Benz et al. | 156/530 |
| 3,919,039 | 11/1975 | Rohner | 156/562 |
| 4,181,554 | 1/1980 | Rich | 156/518 |

*Primary Examiner*—Jerome W. Massie
*Attorney, Agent, or Firm*—Jacques M. Dulin

[57] ABSTRACT

The invention relates to a method and to an apparatus for the production of stamp or photo album leaves with slip-in pockets for the stamps. Two transparent sheets in web form are linearly bonded to one another, and slip-in pockets are stamped out of the bonded sheet material to form double sheet pockets joined along a linear edge. The slip-in pockets are stamped out of the double sheet web by a stamping tool assembly in a predetermined arrangement corresponding to the pocket placement intended for the album leaf, and holds them firmly in this arrangement by a partial vacuum. In the meantime, an adhesive has been applied to the album leaf in the places provided for the slip-in pockets. The album leaf is then brought into contact with the slip-in pockets held fast by partial vacuum on the stamping tool so that the pockets are secured to the album leaf.

8 Claims, 4 Drawing Figures

APPARATUS FOR PRODUCTION OF ALBUM LEAVES

This application is a division, of application Ser. No. 295,823, filed Aug. 24, 1981.

FIELD

The invention relates to a process for the production of leaves or pages, in particular, stamp or photo album leaves, having one or more slip-in pockets of transparent sheet material glued thereon in a predetermined arrangement. The sheet material is provided with an adhesive along predetermined lines which correspond with emplaced positions on the album leaf, in each case along at least one edge of the slip-in pockets to be applied to the leaf. Blanks are stamped out of the transparent sheet material corresponding to the arrangement and dimensions of the required pockets and cemented to the album leaf.

Further, the invention relates to an apparatus for the automatic production of album leaves having slip-in pockets of transparent sheet material glued thereon. The apparatus includes devices for the feeding-in of transparent sheet material in a web form, devices for the linear application of an adhesive to the web form sheet material, and devices for the stamping of blanks out of the web-type sheet material (pockets), and gluing those pockets to the album leaf.

BACKGROUND

An album leaf-forming apparatus disclosed in German West patent specification OS No. 2,332,541 (unexamined) applies adhesive onto a web of sheet material along predetermined lines continuous in the web direction, and the side of the sheet web provided with adhesive, with leaflets forming pockets being simultaneously stamped out of the sheet, is pressed against the album sheet or leaf to be glued thereon in such a way that only the stamped-out sheet leaflets are glued onto the leaf. The slip-in pockets are formed in the process between the leaflet of sheet material as a cover, and the album leaf itself as a paper back wall.

In many cases, however, for the protection of the objects to be placed in the pockets, it is not sufficient to cover these with sheet material only on the upper side. Paper, for example, may contain chemicals that can migrate and ruin stamps stored in contact therewith. Moreover, with the prior art process, in practice it is hardly possible to regulate the contact pressure of the sheet provided with adhesive lines against the album leaf in such a way over the entire surface that all the stamped-out sheet leaflets dependably adhere to the album leaf, while there does not occur either any adherence of waste web sheet material remaining after stamping, or any troublesome accumulations of adhesive.

The long-felt need in the art, and the problem the invention is designed to solve, is to provide a process and an apparatus for rapid and dependable automatic manufacture of album leaves having slip-in pockets, the upper and lower side of which consist of sheet material.

THE INVENTION

OBJECTS

It is among the objects of the invention to provide a process and an apparatus for rapid and dependable automatic manufacture of album leaves having slip-in pockets thereon, the upper and lower sides thereof consisting of sheet material.

It is another object of the invention to provide an apparatus and method for automatic album leaf production which includes forming double-sided pockets of transparent sheet material, e.g., of a plastic or cellulose material, from which pockets are stamped out and removed from waste web by a special combination two-stage die cutting and suction assembly.

It is another object of the invention to provide a pocket stamping assembly for album leaves in which the pockets are die cut in a prearranged order corresponding to the arrangement in which they are to be glued onto the album page.

It is another object of the invention to provide a two-stage stamping assembly in which longitudinal and lateral cuts are made in sequence in a manner that the cuts overlap slightly at corners so that the corners are cut clearly and completely.

It is another object of the invention to provide an entire integrated automated assembly for the timed sequential forming of a dual web of sheet material glued longitudinally in stripes corresponding to at least one pocket edge, advancing the dual web through a two-stage stamping assembly that has special vacuum suction means for retaining die cut pockets in a predetermined arrangement, meanwhile adhesively stamping preselected zones of an album leaf, and in timed sequence rotatingly advancing the album page into reciprocating pressure contact with the pockets so that they are glued onto the album leaf.

It is another object of the invention to provide an album pocket stamping assembly in which the positions of two sets of cutting knives, one longitudinal and the other lateral, are adjustable in position so that the pocket size and arrangement can be easily changed as desired.

Still further and other objects of the invention will be evident from the description herein.

THE DRAWINGS

The invention is described in more detail in the following, and more particularly, the preferred mode of the apparatus and method are described with reference to the appended drawings in which.

SUMMARY

Figure 1:
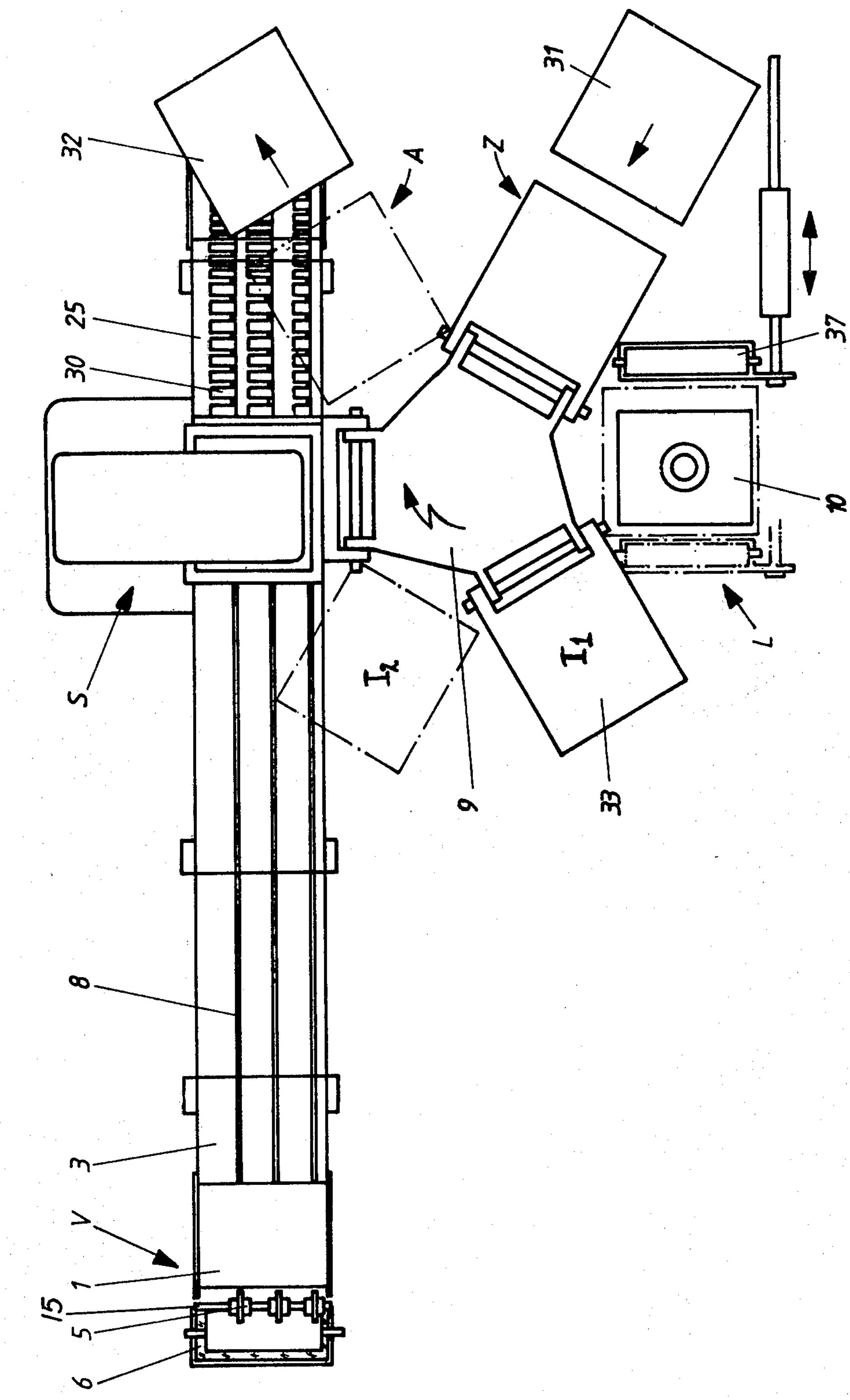
FIG. 1 shows a schematic plan view of the entire apparatus and method of operation.

For the solution of those long-felt problems in the art, the apparatus and process of the invention comprises bonding two sheets, lying one upon another along predetermined lines into a double-sheet web, and stamping out of the linearly bonded double sheet, slip-in pockets having at least one linearly joined edge. The stamped-out, slip-in pockets are retained in their stamping positions corresponding to the predetermined arrangement of pockets on the album leaf. Adhesive is applied to the album leaf in the zones or areas to be glued. Those areas to be glued are then aligned with the allocated slip-in pockets being retained in the stamping assembly and are brought into adhesive contact with each other. In the process of the invention the slip-in pockets to be glued on are made of double-sheet material, and after they have been stamped out of this double-sheet material, they are retained in the predetermined position in which they are subsequently to be applied to the leaf. The album leaf in the meantime is provided with adhesive in the areas to be glued, and thereupon the slip-in pockets are brought into contact with the leaf so that the slip-in pockets adhere firmly to the intended areas. There, the slip-in pockets are not necessarily glued only along one edge to the carrier (album) leaf, but, depending on how the adhesive is applied to the album leaf, they can be cemented to the album leaf over the entire bottom surface of the slip-in pocket, or also along their entire circumference. Accordingly, the adhesive joining of the slip-in pocket to the album leaf can be adapted to the desired requirements.

In one embodiment of the process of the invention, adhesive is applied in a stripe on the album leaf along one edge of each zone to which a slip-in pocket is to be glued. Thus, it is not necessary that the entire edge of the slip-in pocket is cemented to the album leaf from one corner to the other; it suffices if the edge is joined with the leaf partially along its length.

It is preferable to feed the sheet material as a pair of continuous webs lying one upon another drawn off from rolls, and to wet at least one of the fed-in sheet(-film) webs in the zone provided for the linear joining with adhesive, or a solvent adhesively softening the sheet material, and then to press the sheet webs against one another. The drawing off from rolls leads to an especially economical and easily manageable execution of the process of the invention so that a rapid and continuous production of the double-sheet material for the slip-in pockets is ensured.

In the step of stamping pockets out of the linearly bonded double sheet, it is preferred to have two stages of cutting: First, stamping cuts running in a first direction are made, and thereafter stamping cuts running in another direction are made which meet the first cuts in the corners of the slip-in pockets. This achieves cutting out of corner zones cleanly and the sheet material is not subjected to any crimping that could precipitte slight corner damages.

In the preferred embodiment, the album leaf provided with adhesive zones is moved under the slip-in pockets firmly held in the stamping assembly, and they are then pressed together. The slip-in pockets are thereby dependably joined to the album leaves, and it is not necessary to impart any additional movement to the stamping tool in order to apply the slip-in pockets to the album leaf.

In the preferred embodiment, the stamped-out slip-in pockets are firmly held under partial vacuum in the stamping assembly. This partial vacuum is discontinued after the pressing of the slip-in pockets against the adhesive zones on the album leaf. Retention of the slip-in pockets in proper orientation after being stamped out is thereby achieved in a simple and dependable manner.

The album leaf, for use by stamp collectors, for example, may be printed in a visually attractive manner with stamp face facsimilies in the zones to which slip-in pockets are to be glued in order to identify the stamps to be accommodated in the slip-in pockets. By use of a substantially transparent adhesive and transparent sheet material for the slip-in pocket, the print applied under the slip-in pocket is visible so that information is supplied to the stamp collector regarding the stamp to be placed in the pocket.

Further, the apparatus of the present invention comprises: a gluing station assembly or applying adhesive to the areas of each album leaf to which pockets are to be cemented; an assembly for feeding the sheet webs into a web bonding station, which feeding assembly includes adhesive application devices adapted for the linear application of adhesive (or of a fluid adhesively softening the sheet web) onto the side of at least one sheet web which faces the other sheet web; contact-pressure devices in the web-bonding station for pressing one web onto the other along the linear zones of the adhesive-wetted sheet web; a stamping station assembly having adjustable stamping (cutting) tools for stamping out slip-in pockets with at least one linearly joined edge from the double-sheet web; suction devices disposed in the stamping station for the temporary holding of the stamped-out, slip-in pockets in their stamped position corresponding to the predetermined arrangement in which they are to be secured onto the album leaf; web advancing devices for the intermittent, synchronous drawing-off of the waste web of the double sheet remaining after the stamping out of pockets in the stamping station; reciprocating lift devices disposed in the stamping station for pressing the album leaf (having thereon zones provided with adhesive) against the aligned, corresponding slip-in pockets held in place by partial vacuum; and means for the discontinuance of the partial vacuum holding the slip-in pockets after being glued to the album leaf.

The apparatus of the invention permits continuous production of album leaves as it provides the album leaves in a gluing station with an adhesive applied in zones to which slip-in pockets are to be secured. Slip-in pocket construction starts in a bonding station in which two fed-in sheet webs are bonded to one another. In the preferred embodiment a chemical solvent is used to partially dissolve the surface of the sheets, which solvent is applied linearly (continuously along the linear length of the web as it is unrolled), and then the two sheets are pressed together. Due to the surface softening of at least one of the sheets, the two sheets are then bonded to one another. Slip-in pockets are then stamped out of these bonded sheets, the linear joint (bond line) forming an edge of such slip-in pockets. The slip-in pockets, therefore, are formed from two sheets lying one upon the other, which preferably are joined along one edge by the linear solvent/glue application. The residual sheet waste webs are drawn off; they can be cut up in a directly connected cutting device. These cut-up sheet residues are then fed into the inlet side of a sheet extruder (e.g., hot melt or solvent extruder), melted therein, and again extruded into a sheet web.

A lift device (means) is provided in the stamping station. This lift device guides the album leaf to which, as mentioned above, an adhesive has already been applied into position against the corresponding slip-in pockets so that the slip-in pockets in each case are correctly positioned on the zones where the adhesive has been applied. Since the slip-in pockets are firmly held in their proper position by partial vacuum in order to be cemented to the leaf, the partial vacuum is discontinued after the bonding of the slip-in pockets to the album leaf.

In order to keep the space requirement of the apparatus of the invention small, there is provided a turntable for the synchronous aligned movement of the leaves through the gluing station and the stamping station. The continuous passage of the album leaves through the various stations is thereby made possible in a crowded space.

In the preferred embodiment of the gluing station, a gluing template is provided having changeable gluing stamps which can be arranged to correspond to the zones of the album leaf to be glued. Further, the gluing station includes devices for wetting the gluing stamps with adhesive, and contact-pressure devices for the aligned pressing of the gluing stamp wetted with adhesive against the zones of the album leaf to be glued. Such a gluing template, in which the arrangement of the gluing stamps corresponds to the arrangement of the stamped-out and firmly held slip-in pockets, makes possible in one operation the complete gluing of the album leaf in any predetermined arrangement. The adhesive is typically a resin-based dispersion adhesive suitable for adhering polystyrene film of the pockets to paper backing of the album leaves.

The linear application of adhesive material in order to make an adhesive bond between the sheet or film webs is done by arranging one or more wetting wheels or rolls lying with their outer edge against at least one sheet web, which wheels are rotatably borne on a shaft having an axis of rotation running transversely to the direction of movement of the sheet web. These wheels wet the sheet web linearly in its longitudinal direction with a solvent (e.g., toluene, xylene or styrene monomers for styrene film) or glue. The solvent or glue material to be applied to the web is applied on the circumference of these wetting wheels and is transferred onto the sheet web. This ensures a continuous and uniform wetting. Simultaneously, the web sheets or films smoothly advance as they are supported on rollers during the wetting step. For adaptation to the given conditions, the wetting wheels can be made laterally adjustable on their supporting shaft.

The wetting wheels cooperate in each case with a wetting roller which is partially immersed in a bath containing the adhesive or fluid (e.g., solvent) for adhesively softening the sheet web. One side of the wetting wheels, therefore, contacts a wetting (supply) roller, which serves the purpose of transferring the bonding material, namely, adhesive or a fluid by which the foil web is adhesively softened, onto the wetting wheels. It is helpful to have the wetting wheels interact with an apportioning device (such as a doctor blade) which apportions onto the wheels the desired amount of adhesive or solvent fluid that adhesively softens the sheet webs.

In the preferred embodiment, a one-piece stamping assembly has two stages: first, changeable stamping (cutting) tools for generating the stamping cuts running in a first (longitudinal) direction, and second, changeable stamping (cutting) tools for generating the stamping cuts running in another (lateral) direction disposed upstream (in the direction of conveyance of the sheet web) adjacent to the first tools. Thus, there is possible, for example, in the first stage the stamping of the sheet web in longitudinal direction and then, with the aid of the second stamping tools, the stamping of the sheet web in the transverse direction. This achieves an especially true-to-measure and trouble-free stamping out of the slip-in pockets. The cutting blades of the stamping tools are constructed in such a way that they cross somewhat at the corners where the stamping cuts met one another. In this manner there is achieved extremely true-to-measure and clean corner cuts in which the sheet material of the double web is not stretched in the corner zone. Stated another way, with each vertical reciprocation of the stamping assembly, two stages of cuts are made in the web. The first, upstream cuts are longitudinal cuts. Then the web is advanced downstream, and the next stamping stroke makes the second stage cross (transverse or lateral) cuts to intersect the longitudinal cuts, while the adjacent, upstream longitudinal oriented cutting blades make the first stage cuts of the next set of pockets, and the cycle is then repeated.

In order to make possible better detachment of the separate slip-in pockets from the rest of the sheet web, the second, downstream (in the direction of conveyance of the sheet webs) stamping tool has elastic support blocks in the position of an album stamp disposed between the cutting blades generating the stamping cuts of a slip-in pocket. These resilient support blocks have face surfaces that vertically slightly overhang (or project beyond) the cutting edges of the cutting blades, and each slip-in pocket position has at least one suction opening connected to a suction device. The slightly overhanging face surface serves the purpose of releasing the slip-in pockets from contact with the cutting blades after the cut. The retention of the slip-in pockets on the face surfaces of the support blocks is maintained by the suction at the suction openings in the support blocks.

For universal application and ease of maintenance of the machine, the cutting blades associated with a particular arrangement of slip-in pockets are disposed in an intermediate support block to form a separately changeable tool element. Thus, by changing a single sub-assembly component, the entire apparatus can be adapted to a new arrangement of slip-in pockets for the album leaf. The cutting blades allocated in each case to a slip-in pocket together with the intermediately lying support block forms a tool element adjustably fastened in each case parallel and/or transversely to the conveyance direction of the dual-sheet web.

In the operation of the machine, devices are provided for the aligned feeding of the album leaf or sheet (which has been provided with adhesive) into contact with the slip-in pockets held fast by partial vacuum on the support blocks on the underside of the stamping tool. The assembly of the finished album leaf is facilitated by moving the leaf under the slip-in pockets that are held fast on the stamping tool, and then lifting it so that the adhesive applications on the album leaf contact the slip-in pockets.

The apparatus may be easily set up for different arrangements of slip-in pockets on album leaves by providing that the gluing wheels for the linear wetting of the film web are adjustable on their shaft, that is, they may be selectively arranged in a direction transverse to the linear wetting zones they generate on the moving web. Further, the blades are moveably arranged in the stamping tool and, likewise, the gluing stamps are adjustably fastened to a base plate so they may be adjusted in a transverse direction and/or a longitudinal direction for each desired arrangement. In this manner the apparatus can be converted rapidly and simply for the manufacture of another type of album leaf. It is not necessary, therefore, to provide for each leaf type: separate stamping tools, special gluing templates, and special devices for applying the adhesive to the sheet or film webs. The process steps and the apparatus features that relate to the production of the double-sheet webbing may be omitted in cases where a double-sheet webroll is already available and ready for further processing in a desired arrangement.

DETAILED DESCRIPTION

The following detailed description is by way of example and not by way of limitation of the principles of the invention and makes reference to the apparatus and method represented in the figures.

Turning first to FIG. 1, the apparatus represented in the figures has a turntable 9 having three album leaf (or page) carriers 33 arranged at equal circumferential spacings (120° apart). The leaf carriers are provided in each case with means for supporting a leaf 14 (see FIGS. 3 and 4) in proper alignment so slip-in pockets may be secured to it. The turntable 9 is rotated by a drive device (not shown) in steps of 60° so that each leaf carrier 33 after six operating steps has completed one revolution and has returned to its starting position.

As best shown in FIG. 1, turntable 9 rotates successively into engagement with (in clockwise order): a feed station Z; a gluing station L; two interim stations $I_1$ and $I_2$; a stamping station S; and a delivery station A. In the feed station Z a feed magazine 31 supplies a blank album leaf 14 into proper alignment in a recess in leaf carrier 33 (see FIGS. 3 and 4).

Figure 3:
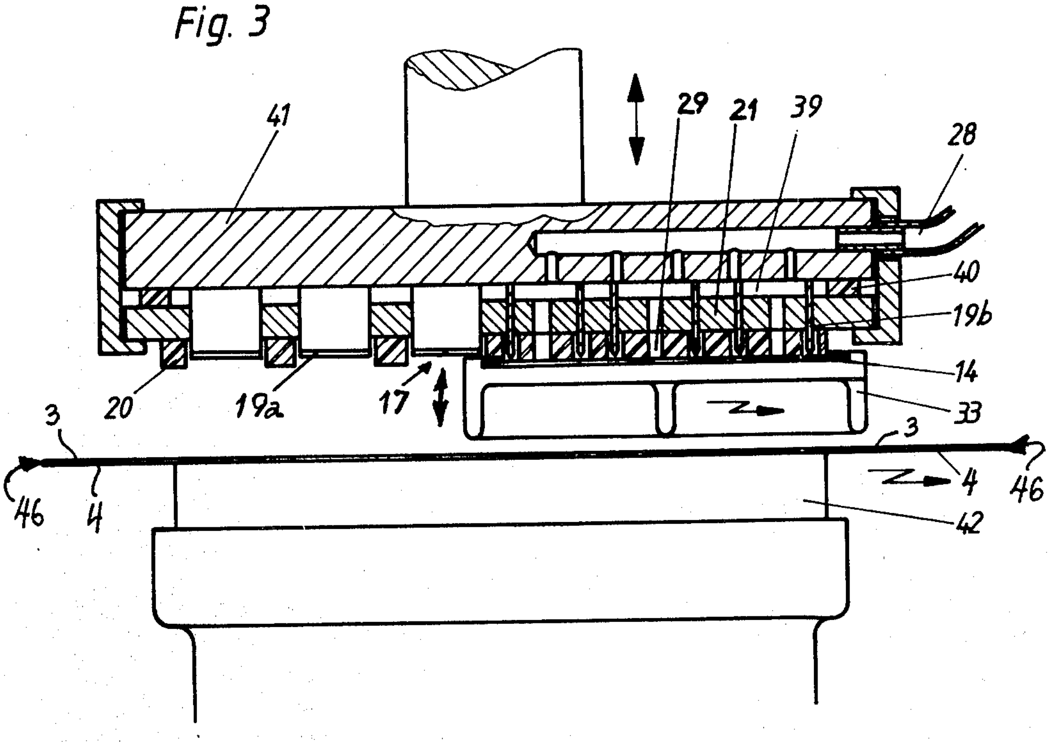
FIG. 3 is a schematic side view of a two-stage stamping and vacuum holding assembly.
Figure 4:
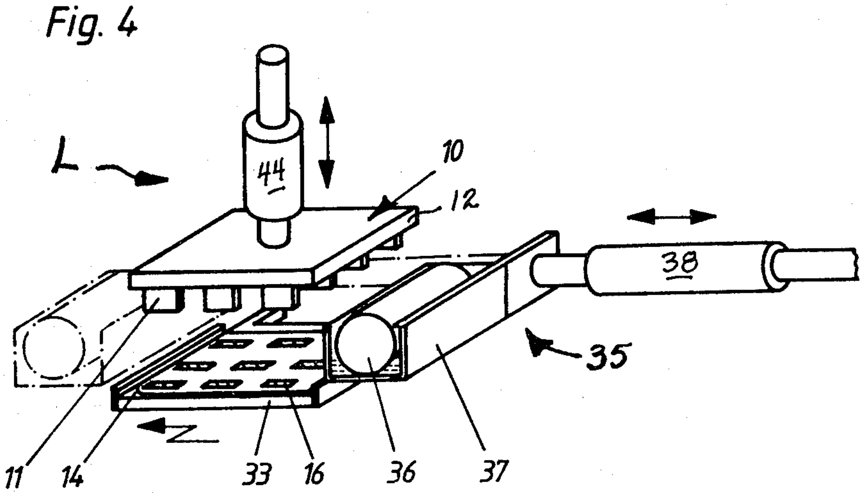
FIG. 4 is a schematic side view of the gluing station assembly.

In the next working step (or beat) this leaf carrier 33 is swung into the gluing station L. As best seen in FIG. 4, there is arranged over the leaf carrier 33 a gluing template assembly 10, which carries a plurality of gluing stamps 11. The gluing stamps 11 are fastened to a base plate 12 in a manner which permits them to be adjustable relative to one another in both lengthwise and transverse directions. In the embodiment shown in FIG. 4, the gluing stamps 11 are provided on their end surface facing the leaf carrier 33 with a porous, compressible gluing cushion. Reciprocable glue applicator assembly 35 having a rotating gluing roller 36 is disposed beside the gluing template 10. The glue applicator assembly 35 is moved by reciprocating means 38 over the gluing cushions of the gluing stamps 11 in order to wet them with adhesive during the operating step in which no leaf carrier 33 is present in the gluing station L. The gluing roller 36 is provided with adhesive during its rotation in contact with gluing stamps 11, thus wetting the gluing cushion from an adhesive bath 37. During the operating step in which a leaf carrier 33 is present in the gluing station L, the gluing template 10 with its gluing stamps 11 is pressed by a lift device 44 against the album leaf 14 in such a way that there is applied to each album sheet (page) a narrow adhesive stripe 16 in the predetermined zones to be glued. These glue stripes 16 are arranged to coincide with the edge along which the linear connecting edge of slip-in pockets will be located after they are glued down in stamping station S (FIG. 3). For this purpose the gluing stamps 11 are arranged on the gluing template 10 in each case in such a way that they are aligned opposite the areas of the leaf 14 lying under them which are to be glued.

In the following operation steps (working beats), the leaf carrier 33 is then swung out of the gluing station L successively over the two interim stations $I_1$, $I_2$ into the stamping station S.

Figure 2:
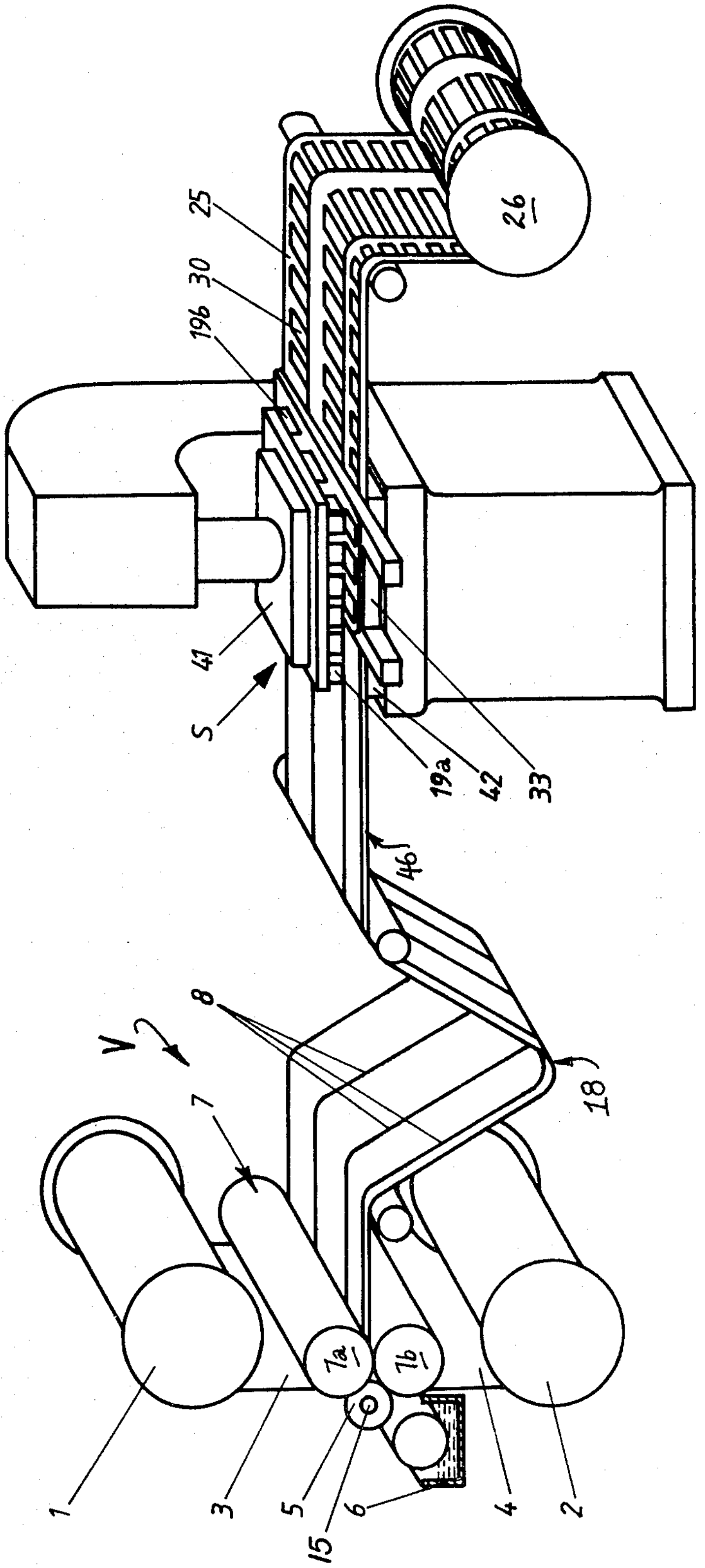
FIG. 2 is a schematized perspective view of the passage of sheet webs through the bonding station assembly and the pocket stamping station assembly.

Turning now to FIGS. 2 and 3, in the stamping station S there is arranged a stamping sub-assembly 17 to which there are fed, advancing intermittently in timed steps synchronized to the turntable rotation, two webs of sheet material (such as a film of polystyrene) 3 and 4 lying one over the other, and bonded linearly together as double web 46. As best seen in FIG. 2, the sheet webs 3 and 4 are drawn off from corresponding webrolls 1 and 2 of sheet material and conducted first through a bonding station V in which there are several wetting wheels 5 arranged on a shaft 15 to be rotatable on an axis of rotation of the shaft running transversely to the conveyance direction of the sheet webs 3 and 4. The wetting wheels 5 lie with their circumferential edge against one or more of the sheet webs 3 and 4. The wetting wheels 5 are transversely adjustable on their axial support shaft 15 relative to the sheet web 3. The wheels 5 also receive, on another part of their circumference, a fluid such as a solvent which adhesively softens the sheet material of the web, or an adhesive, from wetting bath 6. The wetting wheels 5 thus generate bonding stripes on the sheet web 3 which run in the longitudinal direction of the web, and in which stripe areas the sheet material is adhesively softened. The sheet webs 3 and 4 are then run through a contact pressure assembly 7 formed by two opposed pressure rollers *7a,7b* which press the sheet webs 3 and 4 against one another. Through adhesion of the wetted stripe lines, linear bonds 8 are generated in which the sheet webs 3 and 4 are permanently joined to one another. The linearly bonded, double-sheet web 46 thus-generated is fed then to the stamping station S, in which, by means of the stamping assembly 17, the required slip-in pockets are stamped-out.

Referring to FIG. 2, for the feeding-in of the double-sheet web 46 to the stamping station S, the web 46 runs through a draw-roller pair *7a,7b* (additional rollers not shown may be employed), which ensures a uniform drawing-off from the webrolls 1 and 2. A hanging loop 18 of the bonded double-sheet web 46 is formed downstream of the draw-roller pair since the advancement of the web 46 through the stamping station 11 occurs rhythmically stepwise in sections one album leaf wide in each operational step. The loop formation makes possible the transition from continuous movement of double-foil sheet web 46 to index movement. A dancer roller (not shown) may also be provided in the bottom of the loop to assist in maintaining the proper loop size.

As best seen in FIG. 2, the individual slip-in pockets are stamped out and secured onto the album leaf 14 in the stamping station S by means of the stamping tool sub-assembly 17 as described further below. The waste 25 from double web 46, which now contains stamping holes 30, is wound onto a roll 26. The waste film can be recycled again into sheet material, e.g., by hot melt extrusion.

The stamping station S is represented in FIG. 3. It includes a counterpressure plate 42 disposed underneath the bonded sheet web 46 to serve as support against which the cutting blades 19*a,b* bear. The cutting blades 19*a,b* are secured in a plate 21 and are braced against an upper pressure plate 41 which can execute an up-and-down movement for the stamping operation as shown by the arrow. The cutting blades 19 are arranged between resilient support blocks 20 which provide elastic members extending beyond the edges of the cutting blades 19*a,b*. Spacing is provided between the support blocks 20 and cutting blades 19*a,b* so contact of these two parts is avoided to prevent support blocks 20 from becoming electrostatically charged by friction against the cutting blades 19*a,b*. A suction chamber 39 which communicates with a suction device 28 is provided behind the support blocks 20. The suction device 28 creates a partial vacuum in the suction chamber 39. The support blocks are either formed with suction channels 29 or are porous so that in the presence of a partial vacuum there arises an air flow through the support blocks 20 into the suction chambers 39. The suction chamber 39 is closed off to the outside with a sealing ring 40 so that the air entry into the suction chambers occurs only over the support blocks 20.

The manner of operation of the stamping station S is as follows (See FIGS. 1, 2 and 3): In a first operating step the stamping tool is lowered downward so that the cutting blades 19*a* cut into the double web 46. As seen in FIG. 3, the left (or upstream) half of the web 46 receives exclusively lengthwise cuts made by cutting blades 19*a* while the second (right,downstream) half, the cutting blades 19*b* are arranged transversely to the direction of movement of the web 46 so that they impart transverse cuts to the double-sheet web 46. Then, after raising the pressure plate 41 with the cutting blades 19*a,b* fastened to it, the sheet web 46 is moved onward to the right a prescribed distance (the width of the album leaf), so that in the places in which so far only the longitudinal cuts have been made, there are now made transverse cuts by the transversely oriented cutting blades 19*b*. Thus, in the case of rectangular pockets to be stamped out, first the two lengthwise sides are stamped, and thereafter the two related transverse sides are stamped. Accordingly, after this second operating step the finished slip-in pockets are stamped out in the right half of the stamping tool in FIG. 3. Simultaneously, the suction device 28 generates a partial vacuum, in the suction chamber 39 and through the suction channels 29, which securely holds the stamped-out pockets onto the support blocks. The elasticity of the support blocks serves to strip the stamped material (pockets) from the cutting blades while the pockets are simultaneously held in place with the aid of the partial vacuum. During these stamping steps (two-stage, pocket-forming operation), the turntable 9 has moved through intermediary positions $I_1$ and $I_2$ (FIG. 1).

Returning to FIG. 3, then, in a third operating step, the leaf carrier 33 with the album leaf 14 borne on it is conducted under the raised stamping assembly 17 so that the slip-in pockets held in place by the partial vacuum are aligned over the adhesive applications that were earlier applied to the leaf 14 in the gluing station L. The leaf carriers 33 with the leaf 14 borne on them and the pockets held in place by partial vacuum are now brought together, preferably by lifting the leaf carrier 33 (see the double-headed arrow to the left of carrier 33 in FIG. 3). The adhesive stripe areas 16 now touch the slip-in pockets (lower web portion 4). Simultaneously, the suction device 28 is switched off so that the partial vacuum which sucks the slip-in pockets firmly in position on the support blocks is discontinued, and thereby the slip-in pockets are freed from the support blocks 20. The adhesive areas 16 on the leaf 14 now hold the slip-in pockets so that they are secured in the intended places in the desired manner. The leaf carrier 33 is thereupon rotated onward so that the stamping tool can start again with the first operating step in a new cycle. Since in each stamping cycle, simultaneously with the first longitudinal cutting step in the upstream part of the double web 46, the slip-in pockets are also stamped finished in the second, downstream section of the web 46, the synchronous operation provides that after the stamping tool is lowered and raised, the leaf carrier with the album leaf 14 lying on it then takes off the slip-in pockets from the stamping assembly 17. Thereafter, the cycle repeats with another reciprocation of the stamping tool assembly and a further removal of the slip-in pockets.

The completed album leaf 14 having the slip-in pockets glued thereto is fed by the next operation step of the turntable 9 to the delivery station in which it is deposited in the storage magazine 32.

It should be understood that various modifications within the scope of this invention can be made by one of ordinary skill in the art without departing from the spirit thereof. I therefore wish my invention to be defined by the scope of the appended claims as broadly as the prior art will permit, and in view of this specification if need be.

I claim:

1. Apparatus for the automatic production of album leaves having slip-in pockets of double-layered thin plastic film glued thereon including in operative combination:

(a) means for supplying a pair of webrolls of thin plastic film;

(b) means for advancing two webs of said thin plastic film into contact in a longitudinal web-bonding station, said bonding station including:

(i) means for application of adhesive, or of a fluid adhesively softening the sheet web, in a plurality of linear stripes spaced transversely apart onto the side of one sheet web of plastic film which faces the second sheet web of plastic film; and (ii) means comprising contact pressure devices for pressing together the stripes of adhesive or fluid-moistened sheet webs of plastic film to bond the film along longitudinal zones to form a double-sheet web of plastic film;

(c) means for applying adhesive to preselected areas on each album leaf to which said pocket blanks are to be glued disposed in a gluing station;

(d) means comprising an adjustable stamping subassembly disposed in a stamping station for forming pocket blanks of slip-in pockets spaced longitudinally and transversely apart, each having at least one linearly joined edge from the double-sheet web of plastic film, said stamping station including:

(i) means for creating a partial vacuum by suction disposed in said stamping station for the intermediate retention of stamped-out, slip-in pockets in their corresponding longitudinally and transversely spaced apart position relative to one another as produced in the stamping, which positions are aligned with and correspond to the redetermined arrangement in which said pockets are to be glued to said album; and (ii) means for the termination of the partial vacuum when said slip-in pockets are glued onto said album (e) means for the intermittent, stepwise, synchronous drawing-off of the waste web of said double-sheet web of plastic film, which waste containing longitudinally and transversely spaced stamping holes remains in the stamping station after stamping-out of said pockets and during gluing of the pockets onto the album leaf; and (f) means comprising a lifting device disposed in said stamping station for the aligned pressing of said album leaf provided with said preselected zones of adhesive into contact with said corresponding slip-in pockets retained by said partial vacuum.

2. Apparatus as in claim 1 which includes means comprising a turntable for the stepwise, synchronous movement of said album leaves in proper alignment through said gluing station and said stamping station in sequence.

3. Apparatus as in 2 wherein said gluing station assembly includes:

(a) a changeable gluing template having moveable gluing stamps disposed thereon, which stamps may be arranged to correspond to the areas of the album leaf to be glued to accommodate various different pockets;
(b) means for wetting the gluing stamps with adhesive; and
(c) means comprising a contact pressure device for the aligned pressing of the gluing stamps wetted with adhesive against predetermined areas on the ablum leaf to receive said adhesive.

4. Apparatus as in claim 1 wherein said linear adhesive application means includes a plurality of adhesive wetting wheels, each disposed with its outer rim in contact with at least one sheet web of plastic film, which wheel is rotatably borne on a shaft having an axis of rotation transverse to the direction of movement of the sheet web, thereby to wet said contacted sheet web in linear stripes in its longitudinal direction.

5. Apparatus as in claim 4 wherein said adhesive wetting wheels are adjustable on said shaft in a direction transverse to the sheet web, and which includes an adhesive transfer roller in contact with said wheels, said transfer roller being immersed in a bath containing an adhesive, or a fluid adhesively softening the sheet web.

6. Apparatus as in claim 5 wherein said stamping sub-assembly includes first cutting blade means for generating the stamping cuts running in a first direction, and second cutting blade means joined to said first means for generating the stamping cuts running in another direction, said second stamping means being disposed downstream of said first means relative to the direction of conveyance of said double-sheet web through said stamping station.

7. Apparatus as in claim 6 wherein said second cutting blade means includes a plurality of elastic contact blocks having a face surface projecting slightly beyond cutting edges of said cutting blades, said elastic contact blocks being disposed between said cutting blades, and at least one suction opening disposed in each elastic block connected to said suction means.

8. Apparatus as in claim 7 wherein said second cutting blade means together with said contact blocks disposed therebetween are adapted to be adjustable parallel and/or transversely to the direction of conveyance of the double-sheet web.

* * * * *